Patented Jan. 4, 1949

2,458,469

UNITED STATES PATENT OFFICE 2,458,469

METHOD FOR DEIRONING CHROMIUM AND MANGANESE ORES

André Greffe, La Bathie, France, assignor to Societe D'Electro-Chimie, D'Electro-Metallurgie et Des Acieries Electriques D'Ugine, Paris, France, a corporation of France No Drawing. Application July 4, 1945, Serial No. 603,279. In France December 13, 1943

Section 1, Public Law 690, August 8, 1946
Patent expires December 13, 1963

2 Claims. (Cl. 75—27)

Chromium and manganese ores usually contain a considerable proportion of iron. The problem of eliminating the iron from such ores is given in a large number of cases and more particularly when one wishes to extract manganese or chromium from said ores in a pure or nearly pure condition.

The thermo-chemical methods used for carrying out such a de-ironing operation consist essentially in charging an electric furnace with the ore to be treated mixed with a judiciously determined quantity of a suitable reducing agent, and in carrying out, in said furnace, the reduction of the iron oxide contained in the ore and, therefore, the elimination of the iron as metallic iron.

The reducing agents which are preferably used for such an operation are carbon and silicon. Owing to the equilibrium existing between the iron and chromium or manganese contained in the metallic phase, on one hand, and on the other hand, the corresponding oxides of the molten ore, it is necessary, if one desires to reach very low iron oxide contents in the ore, to reduce a part of the chromium oxide or manganese oxide in the ore. This results in making the already de-ironed ore poorer in chromium or manganese oxide, whereby the subsequent operations such as, for instance, the extraction of chromium or manganese in a pure condition is made more difficult and more expensive.

When carbon is used as a reducing agent, the proportion to be used is difficult to determine exactly. One is lead to add an excess of reducing agent to the mixture such an excess resulting in a complementary reduction of chromium or manganese oxide and in a still more strongly marked impoverishment of the slag in the oxide.

The use of silicon shows a different kind of objection owing to the fact that it gives rise, in the course of reduction, to formation of a considerable quantity of silica which it is necessary to saturate with lime if one desires to prevent the metal obtained from the de-ironed ore from containing considerable quantities of silicon. The thus formed silica and the lime used for its saturation still further dilute the chromium or manganese oxide contained in the slag formed in consequence of the de-ironing operation.

The applicant has found, furthermore, that the reduction products, which are either a ferro-manganese or a ferro-chromium, do not separate from the slag phase in an absolutely complete manner but remain imbedded in this phase as fine drops, so that the slag, while containing now only a small quantity of iron oxide, still contains as an alloy appreciable quantities of iron in the metallic form; this iron is, of course, a nuisance in the subsequent operations to which it may be necessary to submit the slag, particularly when one wishes to extract, from such slag, very rich ferro-chromium or ferro-manganese or even commercial metallic chromium or manganese.

The present invention relates to a method which makes it possible to remedy the above mentioned disadvantages and to obtain a very complete de-ironing of the slag in an economical manner and without wasting any chromium or manganese.

The method according to the invention consists chiefly in de-ironing the ore in two successive operations, thru reduction of the iron oxide contained in said ore, by submitting the ore to be treated, molten and possibly added with a flux such as for instance lime, to the action of an alloy composed of iron and the base metal of the ore, this alloy being rich in this latter metal, thereafter separating the resulting metallic phase from the overlying slag and submitting the latter to the action of a small quantity of the base metal of the ore in a pure or nearly pure condition. Thus, one obtains, on one hand, a completely de-ironed slag and, on the other hand, an alloy composed of iron and of the base metal of the ore, rich in this metal and which can advantageously be used for effecting the first operation in a subsequent cycle of manufacture.

Thus, according to the invention, the de-ironing is no longer effected by means of carbon or silicon as usual but by using for reducing the iron oxide the metal itself which forms the base of the ore to be treated. Thus, if the ore is a manganese ore, one shall resort to manganese as a reducing agent.

In the course of the first part of the operation, when starting from manganese ore one obtains, on one hand, a ferro-manganese with a lower manganese content than the one which has been used for reduction of the iron oxide but which is fitted for suitable industrial uses, for instance in the state of ferro-manganese itself, and, on the other hand, a slag which is partially de-ironed but which contains more MnO than the starting ore contained, since the reduction by the alloy rich in manganese reintroduces MnO into the slag. This slag is thereafter directly treated with pure manganese or with a ferro-manganese rich in manganese, thus resulting in a ferro-manganese which is still very rich in manganese; the remaining slag is very poor in iron oxide, because on the one hand, it is or at least has been in contact with an alloy which is very rich in manganese and has a low iron content, the reduction of the iron oxide being thus very extensive and, on the other hand, because the small metallic particles which remain in suspension in the slag, their separation being difficult to carry out, have substantially the same composition as this alloy, that is to say are themselves rich in manganese and poor in iron.

In practice, the de-ironing operation is advantageously carried on in the following manner:

To the previously molten manganese ore is added the necessary quantity, determined by experience, of a low manganese alloy coming from the second part of a previous operation. When the reaction is ended one decants the slag and draws off the obtained ferro-manganese (which ferro-manganese can be sold as refined ferro-manganese). Rich manganese is then added to the slag resulting from the operation and already very poor in iron, and the above mentioned operation is repeated. Thus, one obtains, on one hand, de-ironed slag and, on the other hand, an alloy of which the manganese content has slightly fallen and which may advantageously be used as a reducing agent in the first part of a subsequent de-ironing operation such as that which has just been described.

The thus obtained slag contains not only the whole of the manganese which was contained in the ore used for the operation, but also manganese oxide resulting from the oxidation of the low manganese alloy which was used as a reducing agent.

On the other hand, the present invention provides for the use of the above defined chief method for obtaining very rich ferro-chromium or ferro-manganese, or even of commercial metallic chromium or manganese, for instance thru an extensive reduction, by means of a reducing agent, of the thus de-ironed slag, according to the manufacturing methods of ferro-alloys.

Such a reduction can be achieved, for instance, in a known manner, thru aluminothermy or by means of carbon.

It is also possible to reduce the deironed slag in two stages by using a method known per se in which an alloy of silicon with the metal to be obtained, which alloy is poor in silicon, is first caused to act on the de-ironing slag with or without a violent intermixing of the reacting elements and in the presence of a base such as lime, such a process giving rise, on one hand, to a very rich ferro-chromium or ferro-manganese or even to commercial metallic chromium or manganese, one part of which can be used for the final de-ironing of the slag in a subsequent de-ironing operation according to the invention and, on the other hand, to a slag containing silica, lime and oxide of the metal to be obtained, said slag being submitted in the course of the second stage, to the action of an alloy of silicon with the metal to be obtained, which alloy is rich in silicon and prepared, for instance, in the electric furnace thru action of quartz and carbon on part of the totally de-ironed slag to be reduced, this second stage which is preferably carried out with a violent intermixing of the phases present giving, on the one hand, a slag containing only silica and lime, which slag is discarded, and, on the other hand, an alloy of silicon with the metal to be obtained, which alloy is low in silicon, said alloy being such that it can be used in the first stage of another reduction operation such as that which has just been described.

The following is an example of execution of the method according to the invention.

*Example.*—250 kg. South African manganese ore containing:

| | Per cent |
|---|---|
| $Mn_3O_4$ | 66.40 |
| $Fe_2O_3$ | 14.00 | were melted in an electric furnace with 210 kg. lime and 20 kg. spar. When the whole was melted, 125 kg. crushed ferro-manganese containing 91.50% manganese were added onto the surface of the bath. On tapping, 65 kg. of ferro-manganese containing 51% Mn and 485 kg. of slag were separated, the slag being then poured into a second electric furnace. The said slag contained:

| | Per cent |
|---|---|
| MnO | 50.94 |
| Total FeO | 1.96 |

These 1.96% FeO represent the whole iron contained in the slag either as an oxide or in the metallic state (non-decanted fine drops of ferro-manganese).

The slag was heated and 120 kilogs of ferro-manganese containing 96.80% manganese were then added. Thereupon 114 kilogs of an alloy containing 90.50% manganese and a de-ironed slag containing:

| | Per cent |
|---|---|
| Total FeO | 0.37 |
| MnO | 54.30 | were obtained.

The total FeO represents all the iron contained either as an oxide or in the metallic state (non-decanted fine drops of ferro-manganese). This slag contains MnO and FeO equivalent to 42% Mn and 0.29% Fe. Thus, $$Mn = \frac{54.30 \times 55}{71} = 42\%$$

$$Fe = \frac{0.37 \times 56}{72} = 0.29\%$$

Such a slag upon reduction will produce ferro-manganese containing about 0.69% iron, that is, less than 1% iron.

$$\left(\frac{0.29}{42+0.29} = 0.69\%\right)$$

What I claim is:

1. The process of producing base-metal of the group consisting of chromium and manganese and containing less than 1% of iron by reduction of ore containing oxide of said base-metal and oxide of iron, which comprises deironing the ore by subjecting it in the molten state to the reducing action of a ferro-alloy which is rich in said base-metal, separating the overlying slag layer from the underlying metallic phase, subjecting the molten slag to the reducing action of a portion of the base-metal obtained as the final product of the process and having a higher content of the base-metal than that in the ferro-alloy used in the first deironing step, whereby the quantity of iron in the slag is decreased but the quantity of oxide of said base-metal in the slag is increased, separating the overlying slag from the underlying metallic phase, and subjecting the deironed slag to a reduction treatment to produce base-metal of said group containing less than 1% of iron.

2. The process of producing base metal of the group consisting of chromium and manganese and containing less than 1% of iron by reduction of ore containing oxide of said base-metal and oxide of iron, which comprises the four following steps: (step 1) deironing the ore by subjecting it in the molten state to the reducing action of a ferro-alloy of said base-metal obtained as a by-product of the second step of a previous operation; (step 2) separating the overlying slag layer containing metallic particles in suspension from the underlying metallic phase and subjecting the molten slag to the reducing action of a portion of the base-metal obtained as the product of the third step of a previous operation and having a higher content of the base-metal than that used in step 1, whereby the quantity of iron in the slag is decreased but the quantity of oxide of said base-metal in the slag is increased; (step 3) separating the overlying slag from the underlying metallic phase resulting from step 2 and subjecting a part of the deironed slag in the presence of lime to a reduction treatment with a silico-base-metal alloy low in silicon obtained as a by-product in the fourth step of a previous operation; (step 4) separating the overlying slag from the underlying metallic phase resulting from step 3 and subjecting the slag to the reducing action of a silico-base-metal alloy rich in silicon obtained by treating a second part of the deironed slag resulting from step 2 with carbon and silica, thereby producing a silico-base-metal alloy low in silicon for use in step 3 and a slag to be discarded containing substantially no base-metal.

ANDRÉ GREFFE.

REFERENCES CITED

The following references are of record in the file of this patent:

UNITED STATES PATENTS

| Number | Name | Date |
|---|---|---|
| 860,799 | Goldschmidt | July 23, 1907 |
| 1,136,669 | Goldschmidt | Apr. 20, 1915 |
| 1,520,240 | Hamilton | Dec. 23, 1924 |
| 1,820,998 | Becket | Sept. 1, 1931 |
| 2,098,176 | Udy | Nov. 2, 1937 |
| 2,127,074 | Udy | Aug. 16, 1938 |
| 2,169,741 | Perrin | Aug. 15, 1939 |